United States Patent [19]

Lautenschläger, Jr.

[11] Patent Number: 4,549,831
[45] Date of Patent: Oct. 29, 1985

[54] SET OF JOINING HARDWARE

[75] Inventor: Karl Lautenschläger, Jr., Reinheim, Fed. Rep. of Germany

[73] Assignee: Karl Lautenschlager KG Mobelbeschlagfabrik, Reinheim, Fed. Rep. of Germany

[21] Appl. No.: 545,631

[22] Filed: Oct. 26, 1983

[30] Foreign Application Priority Data

Oct. 30, 1982 [DE] Fed. Rep. of Germany ....... 3240335
Jun. 18, 1983 [DE] Fed. Rep. of Germany ....... 3321976

[51] Int. Cl.⁴ ............................................. B25G 3/00
[52] U.S. Cl. .................................. 403/231; 403/323;
403/403; 403/405.1; 24/290; 24/573; 24/591;
16/282; 16/238; 52/285
[58] Field of Search ............... 403/407, 405, 403, 231,
403/323; 52/285, 127.11, 127.12, 127.8; 24/289,
290, 573, 590, 591; 16/383, 282, 238, 245, 246

[56] References Cited

U.S. PATENT DOCUMENTS

| | | | |
|---|---|---|---|
| 2,437,235 | 3/1948 | Akslen | 403/407 |
| 3,999,878 | 12/1976 | Robinson | 403/407 |
| 4,021,881 | 5/1977 | Lautenschläger | 16/383 |
| 4,095,381 | 6/1978 | Garchinsky | 52/127.12 X |
| 4,120,598 | 10/1978 | Zernig et al. | 52/285 X |
| 4,131,376 | 12/1978 | Busse | 52/285 X |
| 4,160,610 | 7/1979 | Austen-Brown et al. | 403/231 X |
| 4,188,685 | 2/1980 | Röck et al. | 16/383 |
| 4,292,003 | 9/1981 | Pond | 403/407 |
| 4,348,130 | 9/1982 | Lautenschläger | 403/231 |

FOREIGN PATENT DOCUMENTS 2358163 6/1974 Fed. Rep. of Germany ...... 403/231
2005853 12/1969 France .................................. 16/383

Primary Examiner—Cornelius J. Husar
Assistant Examiner—Todd G. Williams

[57] ABSTRACT

A joining hardware set for the releasable joining of the back wall of a cabinet to the carcass walls thereof. The hardware set has a back wall-related component in the form of an elongated case open at the bottom, which can be affixed to the back wall, and a carcass-related component which is covered by the back wall-related component when the latter is properly installed and which can be fastened to the carcass wall, the carcass-related component having a sloping engagement surface. A tightening means in the form of a circularly or spirally defined disk is journaled at a point offset from the axis of rotation, and its circumferential surface is a tightening surface which slopes at an angle complementary to the engagement surface of the top section.

25 Claims, 20 Drawing Figures

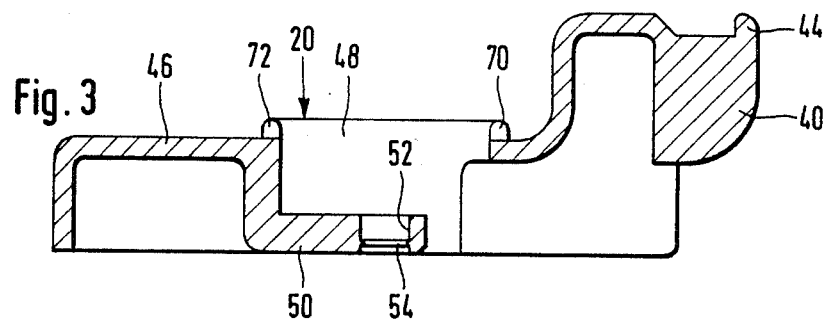
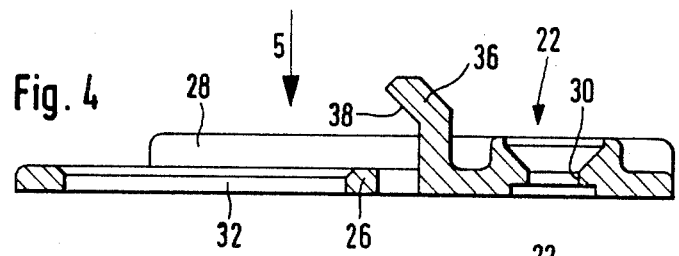
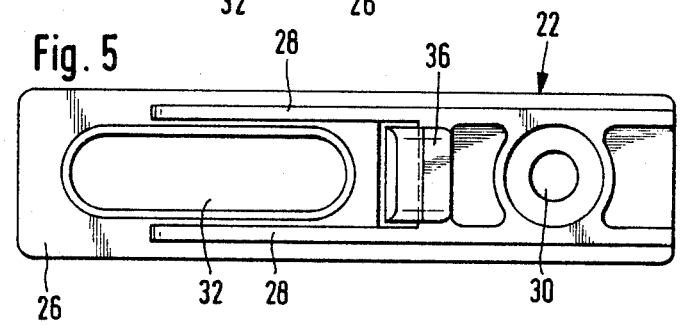
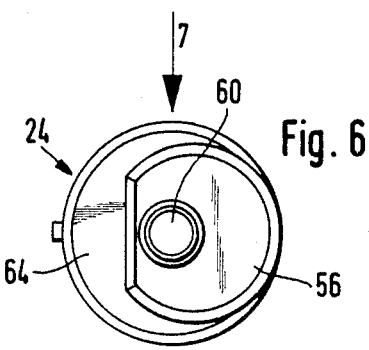
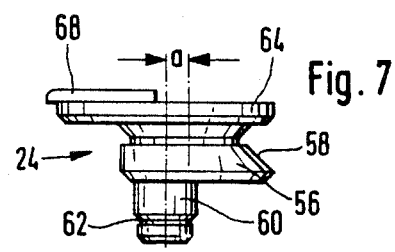

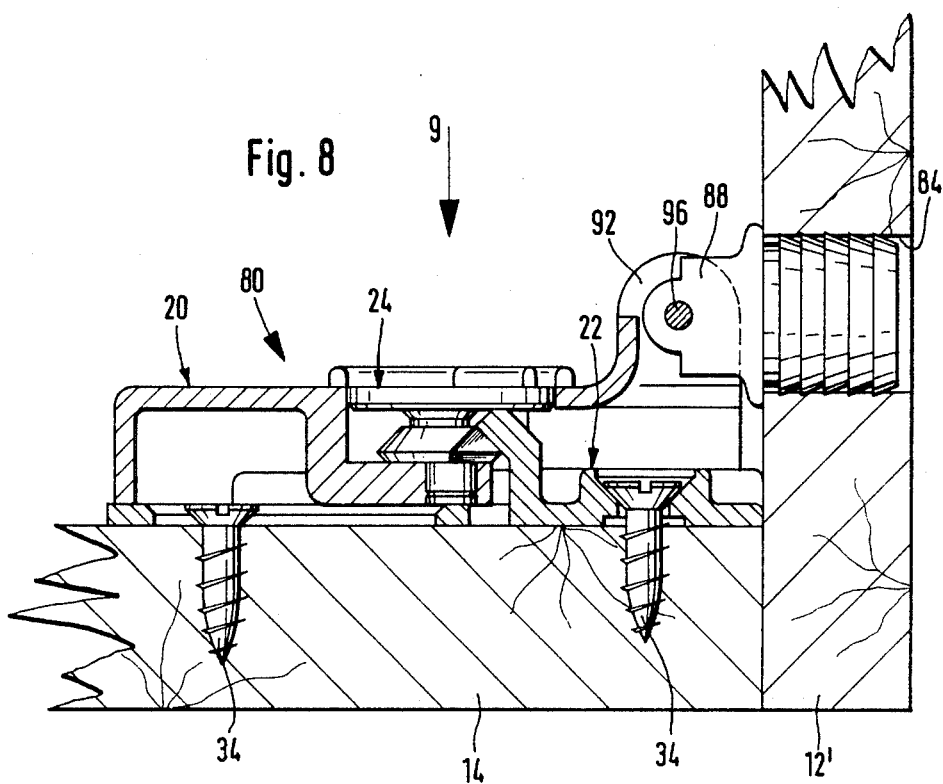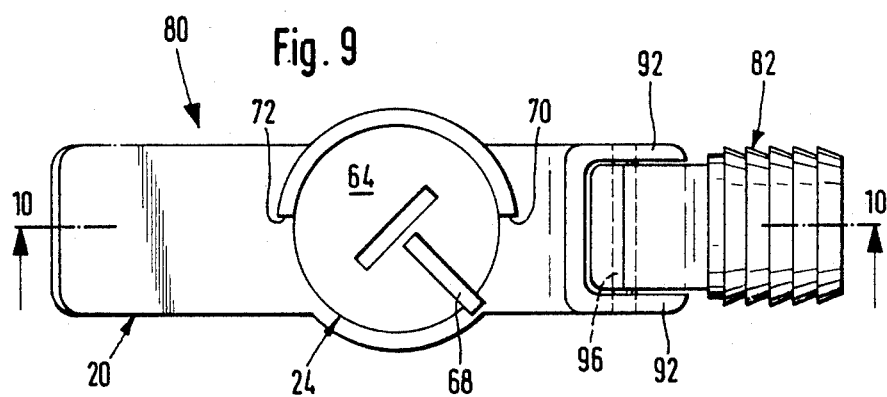

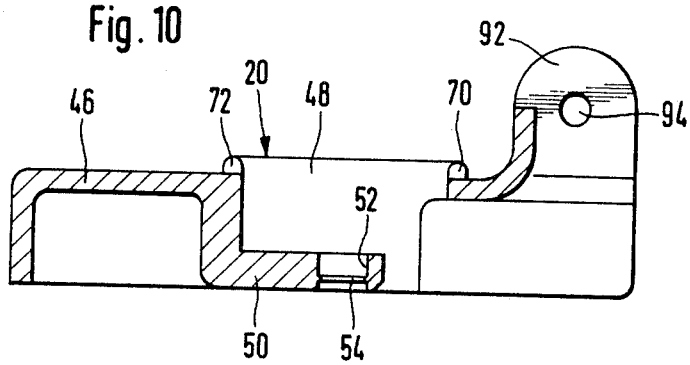
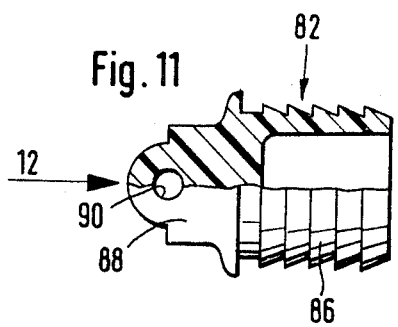
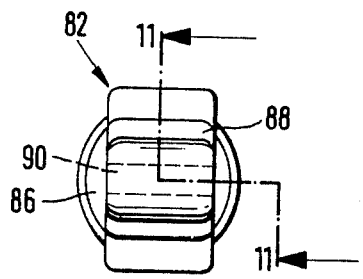
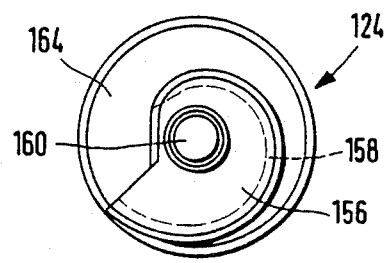

SET OF JOINING HARDWARE

BACKGROUND OF THE INVENTION

The invention relates to a set of hardware for the releasable joining of a back wall of a cabinet to a carcass wall or frame wall thereof, having one component which can be fastened to the meeting marginal area of the back wall and one which can be fastened to the meeting marginal area of the carcass wall, the two components being able to be brought into interlocking engagement with one another, and to be drawn together by a tightening means such that the back wall is tightened against the associated carcass wall.

Joining hardware sets with which the walls of a cabinet carcass—preferably those meeting at right angles—can be joined to one another releasably are used in a great variety of forms for the purpose of compactly storing and transporting cabinets in the unassembled state and reassembling them in a quick and simple manner at the place where they are to be set up. In all cases, the set of joining hardware has components preinstalled on the walls to be joined together, such as for example the side wall and the bottom panel of a cabinet. These components can be brought fully or partially into engagement with one another when the cabinet is assembled, and then the components can be drawn together by a tightening system such that the walls to be joined are forced tightly against one another in the area of their contact surfaces. The stability of the assembled cabinet carcass depends essentially on the fact that the carcass walls, bottom and top, when joined together by joining hardware of the known kind, are stiffened by the back wall of the cabinet against racking. The back walls of the cabinet must therefore be joined to the rest of the carcass walls in an especially tight and secure manner, even when, as is often the case in modern furniture, they are made of thin hardboard or chipboard. Such thin back walls are as a rule inserted into a rabbet in the back edges of the walls forming the rest of the cabinet carcass. Due to the slight thickness of the back wall, it is difficult to premount its associated hardware component sufficiently strongly on the back wall. Cabinet back walls consisting of hardboard are therefore frequently joined to the carcass wall by screws driven through the margins of the back wall into the side walls. It is readily apparent that this method of fastening is time-consuming and laborious, even when holes are made in the back walls for the fastening screws by the manufacturer. In the assembly of built-in cabinets, the back is not, as a rule, accessible for the driving of the screws for assembly, so that the back walls placed against the room wall before the other carcass walls are attached, and consisting usually of thicker board material, have to be assembled from the interior of the carcass by means of sets of joining hardware. This means that, after the side walls and top and bottom have been assembled, the back walls have to be aligned with them, the previously mounted joining hardware has to be engaged, and then clamped together, and this obviously calls for extremely difficult manipulation, because it is impossible to see whether the back wall is precisely aligned with the rest of the carcass walls, and--even if the hardware has been mounted with jigs to the back wall and side walls--a misalignment of the associated, pre-installed hardware components can occur if the previously assembled carcass walls are not precisely aligned with one another in the proper position for assembly.

It is the object of the invention to create a set of joining hardware for the releasable joining of the back wall of a cabinet to its carcass walls, the components of which can be joined together simply and quickly from the interior of the carcass, while assuring the tight assembly of the back wall to the other carcass parts as required for the stability of the cabinet.

Setting out from a joining hardware set of the kind described in the beginning, this object is achieved in accordance with the invention by the fact that the carcass-related component of the set has an engaging surface projecting from the inside surface of the carcass wall, and the back wall-related component is in the form of an elongated housing or case which is open on the bottom facing the carcass-related component and covers the latter, and in which a tightening means is disposed which can be rotated about an axis at right angles to the inside surface of the carcass wall and parallel to the back wall and engages the engaging surface.

In the area of the engagement of the tightening means the engaging surface on the carcass-related component slopes away from the back wall, preferably toward its end facing away from the carcass wall's inside surface, and the associated circumferential surface of the tightening means is then made to slope in a complementary manner. This complementary inclination of the engagement surface and of the circumferential surface of the tightening means brings it about that, when the tightening means is tightened, on the one hand the back wall is drawn against the rear edges of the carcass walls, but at the same time a component of the tightening force is produced at right angles thereto, i.e., parallel to the inside surface of the back wall, which presses the back wall-related part tightly against the carcass-related component.

The carcass-related component can best have the form of a mounting plate which can be fastened on the associated carcass wall at right angles to the latter, and from whose upper side a projection extends into the interior of the back wall-related component.

The tightening means can be, for example, in the form of a disk which is circularly defined over most of its circumference, and has opposite flat sides from which pivot projections extend. These pivot projections which are aligned with each other and offset by a certain amount from the center of the disk are pivotably journalled in associated bearing recesses in the back wall-related component.

Alternatively, the tightening means can be in the form of a disk which is spirally defined over the greater part of its circumference, and from its opposite flat sides pivot projections extend which are journaled in associated pivot sockets in the back wall-related component. The spirally defined tightening disk has the advantage over the excentric, circular tightening disk that a turning angle of more than 180°, 270° for example, and possibly 280°, is available, so that either a greater tightening movement or a higher tightening force can be achieved.

To hold the tightening means in the back wall-related component, the pivot projection extending from the flat side of the tightening disk facing the carcass-related component, can be in the form of a substantially cylindrical pivot having a circumferential annular groove, into which an annular rib projecting from the wall of the associated pivot socket is snapped.

The pivot projection extending from the flat side of the tightening disk facing away from the carcass-related component is enlarged at its outer, free end to a circularly defined disk, which is held pivotally and flush within a circularly defined opening in the wall of the back wall-related component, and is provided on its upper side, which is accessible in the opening, with means for engagement by a turning tool. The circularly enlarged disk thus serves simultaneously for the mounting of the tightening disk in the back wall-related part and as an actuating element which can be engaged by the tool used for tightening the hardware set. The opening in the back wall-related component, which is of a size corresponding to the diameter of the circular disk, permits the installation of the tightening means simply by pushing the tightening means through the opening, security against axial escape and hence against the loss of the tightening means being provided by the above-mentioned snap fastening of the pivot in its associated pivot socket in the back wall-related hardware component.

If the tightening disk is in the form of an excentric disk, the diameter of the circularly defined disk forming the pivot projection is at least equal to the diameter of the tightening disk plus the amount of the excentricity of the tightening disk.

So that the relative rotational position of the tightening disk will be able to be seen, a projection extending radially slightly beyond the circumference of the disk is provided on the upper side of the circularly defined disk of the tightening element, which is accessible in the opening, and thus, so to speak, it forms a pointer, and from the wall area of the back wall-related component surrounding the opening, two abutment surfaces project, against which the projection extending radially beyond the disk will abut at the end of each turning. The pointer thus serves simultaneously to limit the maximum turning angle that is necessary.

To affix the back wall-related component to the back wall, a fastening plug is provided on the back wall-related component which can be inserted into an associated hole in the back wall.

If the back wall is made from a thin hardboard or chipboard, the fastening plug can best be provided at its free end with a hook-like projection extending on the side opposite the carcass-related component. The back wall-related component can then be attached to the carcass by tilting it slightly and inserting the hook-like projection extending from the plug through the hole in the back wall, and then it can be rocked to a position at right angles to the inside of the back wall, while the projection then catches behind the outer surface of the back wall. The back wall-related component then overlaps the carcass wall-related component in the form of a mounting plate, and by operating the tightening means the two components can be clamped together in the manner described.

If the back wall, however, is made from a board of greater thickness, it is recommendable to make the fastening plug separately and mount it pivotally on the back-wall related part about an axis parallel to the flat sides of the back wall and carcass wall being joined together. Then, by hammering or pressing the plug into the associated hole in the back wall, the back wall-related component can be preinstalled and rocked up against the inner surface of the back wall for shipment. To mount the back wall, the latter can then be held by the back wall-related component and guided into correct alignment with the carcass-related part. Then, by turning the back wall-related component down over the carcass-related component, the two components can be brought into engagement and then tightened against one another in the manner already described. Particularly in the case of the assembly of built-in furniture, in which assembly from the back is not possible, the use of the joining hardware of the invention is especially advantageous, because the assembly of the back wall, which has been placed against the room wall prior to the assembly of the carcass, can be performed from inside the carcass.

The fastening plug is best in the form of a plastic plug that is over-size with respect to the bore in the back wall, and to improve its grip in the hole it can be provided on its circumference with radially projecting ribs of saw-tooth cross-sectional profile, in a known manner. Alternatively, the fastening plug can also be in the form of an expansion plug or screw plug.

A simplification of the joining hardware of the invention and more economical manufacture can be obtained if the carcass-related component has a plug section which can be fastened on the inside surface of the carcass wall, and an adjoining head section of larger diameter, whose sloping surface of transition to the plug section forms the engaging surface. That is to say, the simplification of the joining hardware set relates mainly to the carcass-related component.

In an advantageous further development of the invention, the configuration is then made such that the plug section of the carcass-related component is in the form of a short cylinder, and the head section the form of a truncated cone adjoining the end of the plug section facing away from the wall, turned by 180°. The carcass-related component thus is composed of simple, rotation-symmetrical geometrical bodies, so that it can be manufactured in corresponding simple and inexpensive forms from plastic by the injection molding process or, preferably, from metal by the pressure casting method.

On the base of the truncoconical head section facing away from the plug section, a short, circular, discoidal section is provided, whose diameter is about equal to or only slightly smaller than the free distance between the case side walls of the back wall-related component. The circular section of the carcass-related component guides and centers the back wall-related component by means of its cylindrical circumferential surface guided between the case sidewalls, such that the back wall is aligned in the proper position for fastening to the carcass of the cabinet.

The carcass-related component is preferably provided with a through-bore for the shank of a mounting screw, this throughbore having preferably at its head end a countersink to accommodate the head of the mounting screw.

The carcass-related component can be fastened without a separate mounting screw in an alternative embodiment in which a wood screw is provided integrally on the end of the plug section facing the carcass wall, and in that case a recess for the engagement of a tool, in the form of a screwdriver slot or the like, is provided in the exposed top of the head section, and this recess can accommodate a tool for turning the screw into a corresponding mounting bore in the carcass wall.

BRIEF DESCRIPTION OF THE DRAWINGS

The invention will be explained in the following description of a number of embodiments, in conjunction with the drawing, wherein:

FIG. 3 is a cross section through the back wall-related hardware component of the set of hardware as seen in the direction of the arrows 3—3 of FIG. 2;

FIG. 4 is a cross-sectional view through the carcass-related component of the hardware set, as seen in the direction of the arrows 3—3 in FIG. 2;

FIG. 5 is a top plan view of the carcass-related component of the hardware set, as seen in the direction of the arrow 5 in FIG. 4;

FIG. 6 is a bottom view of the tightening means of the hardware set;

FIG. 7 is a side view of the tightening means, as seen in the direction of the arrow 7 in FIG. 6;

FIG. 8 is a longitudinal central cross section corresponding to the cross section in FIG. 1, through a second embodiment of a set of hardware of the invention by which a cabinet back wall made from a thicker board is held in engagement with the edge of a wall of the carcass;

FIG. 9 is a top view of the hardware set as seen in the direction of the arrow 9 in FIG. 8;

FIG. 10 is a cross sectional view through the back wall-related component of the set of joining hardware, as seen in the direction of the arrows 10—10 in FIG. 9;

FIG. 11 is a side view, partially in cross section along the arrows 11—11 of FIG. 12, of a fastening plug with which the back wall-related component can be fastened pivotally to the back wall;

FIG. 12 is a view of the fastening plug as seen in the direction of the arrow 12 in FIG. 11;

FIG. 13 is a bottom view of a tightening means different from the tightening means shown in FIG. 6;

DESCRIPTION OF PREFERRED EMBODIMENTS

Figure 1:
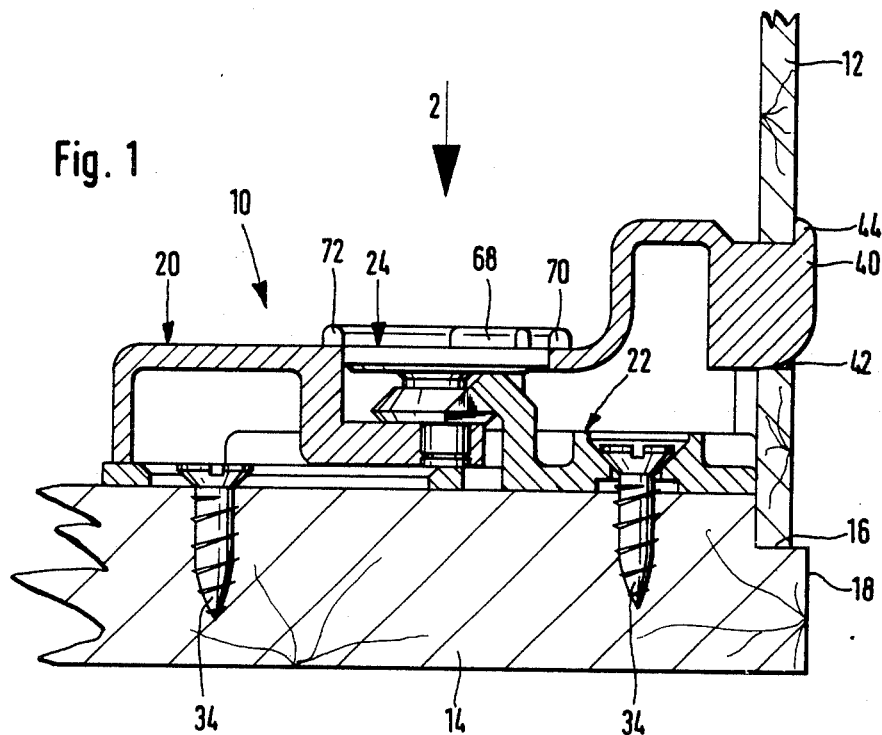
FIG. 1 is a longitudinal cross section through a first embodiment of a set of joining hardware in accordance with the invention, by which a cabinet back wall, made from a thin piece of hardboard, is held in a rabbet in the edge of a carcass wall.
Figure 2:
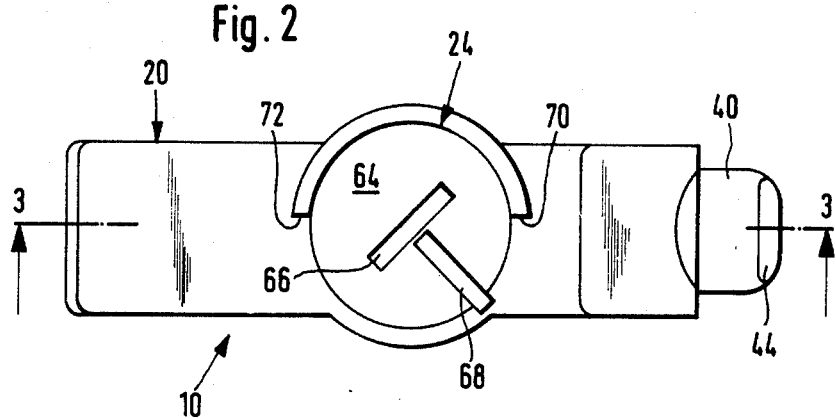
FIG. 2 is a top plan view of the set of cabinet joining hardware as seen in the direction of the arrow 2 in FIG. 1.

The joining hardware set shown in FIG. 1 and 2, and designated as a whole by the number 10 will serve, let us say, for joining together the back wall 12, cut from a thin sheet of hardboard, and a wall 14 of the carcass or frame of a piece of furniture, for example, a side wall or the bottom or top of a cabinet. The back wall 12 is fitted into a rabbet 16 in the rear edge 18 of the carcass wall 14.

The joining hardware set is composed of the parts which will be described in detail below in conjunction with FIGS. 3 to 7, namely the rear wall-related component 20 (FIG. 3), the carcass-related component 22 (FIGS. 4 and 5) and the tightening means 24 (FIGS. 6 and 7). The carcass-related component 22, which is similar in construction to a mounting plate for the mounting of cabinet hinges, has two longitudinal ribs 28 projecting from its plate-like base body 26 in a parallel spaced relationship, and between them two countersunk mounting openings are provided, namely a bore 30 and a slot 32 for mounting screws 34 (FIG. 1). In the area between the bore 30 and the slot 32, a projection 36 extends from the base body 26 centrally between the longitudinal ribs 28, and its side facing away from the back wall forms an engaging surface 38 which slopes away from the back wall.

The hardware component 20 related to the back wall is in the form of an elongated housing or case which can be fitted over the carcass-related hardware component 22, and can be displaced guidingly in the lengthwise direction along the longitudinal ribs 28 engaging the inside surfaces of its side walls. A fastening plug 40 is provided on the back wall-related hardware component at its end facing the back wall. This plug 40 can be inserted into an associated hole 42 (FIG. 1) in the back wall 12, and can then be joined in a form-locking manner to the back wall by a hook-like projection 44 which can catch the back of the back wall.

In the back wall-related hardware component there is provided an open socket 48 for the tightening means 24, which is formed by a circularly defined recess opening on its side facing the back wall 12 into the casing interior; in the center of its floor 50 a bearing bore 52 is provided, from whose circumferential walls a low annular rib 54 projects.

The tightening means shown in FIGS. 6 and 7, which can be inserted into the socket 48, has a tightening disk 56 of circular shape, out of which an arcuately defined section is cut away rectilinearly (FIG. 6). The circumferential surface 58 of the tightening disk 56 is chamfered in its circularly defined area in a manner complementary to the engaging surface 38 of the projection 36. From the bottom flat side of the tightening disk 56, there projects a cylindrical pivot pin 60 projects, which has a circumferential annular groove 62, and which can be inserted into the bearing bore 52 of the back wall-related hardware component 20, this pin being offset by an excentricity "a" from the center point of the tightening disk 56. When the tightening element is in the properly installed position, the annular rib 54 in the bearing bore 52 snaps into the annular groove 62 and secures the tightening means 24 against axial escape from the socket 48 in the rear wall-related hardware component 20. From the flat side of the tightening disk 56, which is opposite the bottom 50 of the socket 48, there projects a journal projection enlarged at its outer free end to form a circularly defined disk 64. The disk 64 lies matingly in the mouth of the socket 48 in the back wall-related component, so that it therefore closes this mouth, on the one hand, and on the other hand holds the tightening disk 56 for rotation in common with the journal 60. In the upper side of the circularly defined disk 64 there is provided a screwdriver slot 66 into which the blade of a screwdriver can be inserted and the tightening element 24 can then be rotated by this screwdriver. Furthermore, on the top of the disk 64 there is formed a projection 68 extending radially slightly beyond the circumference of the disk. This projection 68 constitutes on the one hand a pointer indicating the rotatory position of the tightening means, and on the other hand, in cooperation with two abutments 70 and 72 projecting in appropriate angularly offset position from the back wall-related hardware component, it limits the rotation of the tightening means to about 180 degrees.

To join together the back wall 12 and the carcass wall 14, the fastening plug 40 is introduced into the back wall bore 42 while the back wall-related component 20 is held at an angle, and the back wall-related component is then rocked down onto the carcass-related component 22 preinstalled on the carcass wall 14, whereupon the hook-like projection 44 catches behind the back wall 12.

The tightening means is then turned to such a position that the rectilinear edge of the tightening disk 56 is facing the projection 36 of the carcass-related component 22. In this position, the tightening disk 56 can be lowered past the projection 36. As soon as the back wall-related component 20 is seated on the carcass-related component 22, the tightening means can be rotated, whereupon its chamfered, circularly defined circumferential surface 58 comes into engagement with the engaging surface of the projection 36. As a result of the excentric offset a of the tightening disk 56 from the axis of rotation of the tightening means 24, the increasing rotation of the tightening means produces a traction by which the back wall-related component is displaced on the carcass-related component such that the back wall 12 is drawn with increasing force into the rabbet 16 in the rear edge 18 of the carcass wall 14. On account of the angular engagement of the circumferential surface 58 of the tightening disk 56 with the engaging surface 38 of the projection 36, the back wall-related component 20 is also secured against lifting from the carcass-related component 22. To release the joining hardware set 10, the procedure is reversed.

The joining hardware set 80 shown in FIGS. 8 and 9 differs from the joining hardware set 10 previously described only in that its back wall-related component 20 is especially designed for fastening thicker back walls of wood or chipboard. To avoid unnecessary repetition, therefore, only the differences in the back wall-related component 20 are described, it being otherwise sufficient to refer to the foregoing description of joining hardware set 10 since the same reference numbers are used for corresponding parts of sets 10 and 80.

The important difference from joining hardware set 10 is that the fastening plug 82 is in this case a separately manufactured injection-molded plastic piece which, in its portion which is insertable into an associated fastening bore 84 in back wall 12', is configured as a hammer-in or press-in stud 86 which is over-dimensioned with respect to the diameter of the fastening bore 84, and which can be provided with the known sawtooth-profile ribs to increase its resistance to being torn out axially from bore 84.

A pivot piece 88 flattened on opposite sides and having a transverse bore 90 is injection-molded integrally with the hammer-in stud 86. The pivot piece 88 engages between two ears 92 formed from the lateral walls of the back-wall related component 20 and having each a bore 94. By means of a pivot pin 96 held in bores 94 and passing through the transverse bore 90 in the pivot piece 88, the fastening plug 82 can pivot as a whole about the pin 96, so that, in other words, the back wall-related component 80 fastened to the back wall 12' by means of the fastening stud 82 can be swung upwardly from the position in which is shown in FIG. 8 on the carcass-related component 22 to a position in contact with the inside surface of the back wall, and for this purpose, of course, the tightening disk 56 of the tightening means 24 must be rotated out of engagement with the engaging surface 38 of the projection 36.

In contrast to the joining hardware set 10, the back-wall-related component 20 of the joining hardware set 18 is therefore pre-installed on the back wall 12', and this has the advantage that the back-wall-related component, which can be turned against the back wall in a compact manner for transport, can serve the installer also as a handle when installing the back wall on its cabinet carcass from the inside thereof.

FIG. 13 shows an alternative to the tightening means 24 described in conjunction with FIGS. 6 and 7. This alternative tightening means identified by the number 124 differs from the tightening means 24 only in the shape of its tightening disk 156, in that its periphery is not arcuately but spirally defined, with its spiral engagement surface 158 extending over approximately 270°. The maximum tightening movement of the joining hardware set, by using the tightening means 124, is reached when the tightening means is rotated 270°, while, when the tightening element 24 is used, the maximum tightening movement is reached at 180°. The larger angle of rotation of the tightening means 124 can be utilized either for the creation of a more extended tightening movement or for the achievement of a greater tightening force.

Otherwise the tightening means 124 is largely the same as the tightening means 24, so that a detailed description is unnecessary, inasmuch as corresponding parts of both tightening means are identified with the same reference numbers, with a numeral 1 prefix in the case of the tightening means 124.

Figure 14:
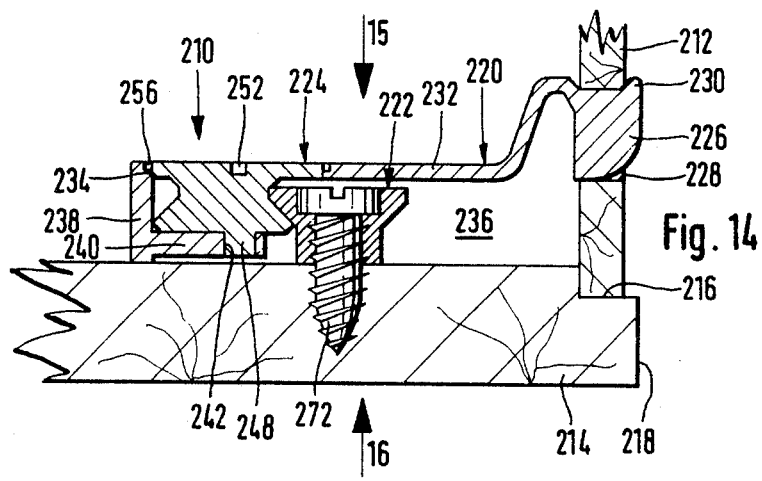
FIG. 14 is a longitudinal central section through an additional embodiment of a set of joining hardware with which a cabinet back wall made of a thin sheet of hardboard is held in a rabbet in the edge of a carcass wall.
Figure 15:
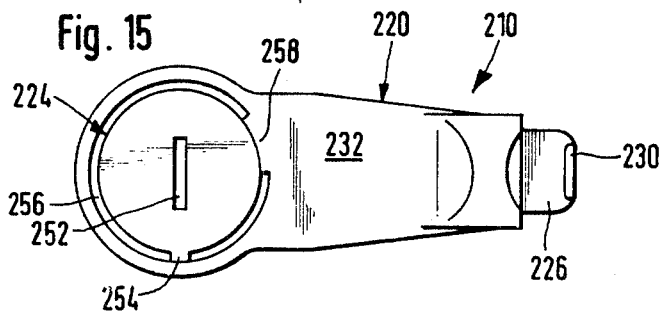
FIG. 15 is a top view of the joining hardware set, seen in the direction of the arrow 15 in FIG. 14.
Figure 16:
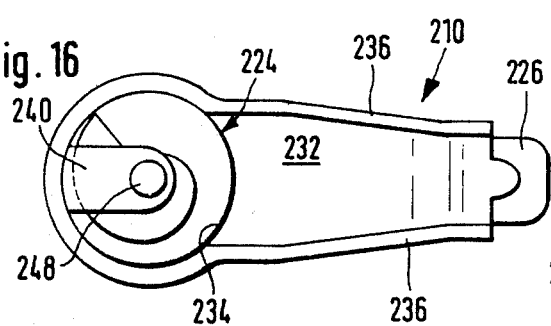
FIG. 16 is a bottom view of the joining hardware set, seen in the direction of the arrow 16 in FIG. 14.

The joining hardware set in accordance with the invention, illustrated in FIGS. 14 to 16 and identified generally as 210, is to be used, let us say, for the joining of the back wall 212 cut from a thin hard-fiber panel, to a carcass wall 214, for example a sidewall or the bottom or top of a cabinet. The back wall 212 fits into a rabbet 216 in the rear edge 218 of the carcass wall 214.

Figures 17, 18:
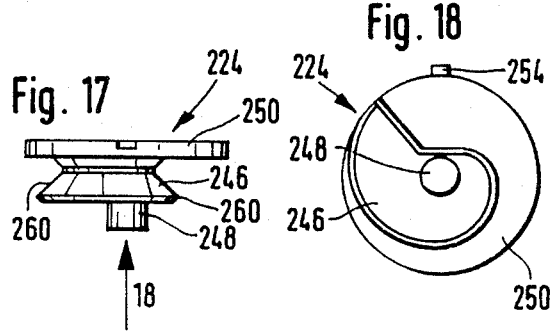
FIG. 17 is a side view of the tightening means, rotatably mounted in the back wall-related component of the joining hardware set shown in FIGS. 14 to 16.
FIG. 18 is a bottom view of the tightening means, as seen in the direction of the arrow 18 in FIG. 17.

The joining hardware set is composed of the back-wall-related component 220, the carcass-related component 222 (FIG. 19) or 222' (FIG. 20) and the tightening means 224 (FIGS. 17 and 18).

The back-wall-related component 220 is in the form of an elongated housing or casing open at the bottom facing the carcass-related component 222 or 222', and it can be fitted onto the carcass-related component and is displaceable longitudinally under guidance by the carcass-related component engaging the inside surfaces of its lateral walls. At its end pointing towards the back wall 212, a fastening plug 226 is provided on the back-wall-related component 220, and can be introduced into the back wall 212 and then, by means of a hook-like projection 230 engaging the back wall 212, it can be hooked into the latter in a form-fitting manner. At the end opposite the plug 226, the channel-like back wall-related component 220 is widened and provided in its web 232 with an open socket 234 to receive the tightening means 224. This socket 234 is constituted by a circularly-defined opening in the web 232 of the back wall-related component.

Beneath this socket, a pivot hole 242 aligned centrally with the socket 234 is provided for the tightening means in a tongue 240 projecting integrally from the end wall 238 just above the bottom edge thereof.

The tightening means 224 shown separately in FIGS. 17 and 18 has as the actual tightener a relatively thick disk 246 of spiral configuration, from whose bottom a pivot pin 248 projects, which is held rotatably in the tongue 240. On the side opposite the pivot pin 248, the tightening means is journaled by means of a circular disk 250 formed on its outer end. The disk 250 thus serves simultaneously as a second pivot for the tightening disk 246 and as a cover for the socket 234. In the top of the circular disk 250 a screwdriver slot 252 is provided, by means of which the tightening means 224 can be turned with a screwdriver. Also, a projection 254 extending radially slightly beyond the circumference of the disk is formed on the top of the disk and engages a concentric, circumferential recess 256 extending over most of the circumference of the socket, in the edge of the latter. The portion which is indicated at 258 in FIG. 15 and is not recessed, and which thus interrupts the circumferential recess 256, thus limits the possible rotation of the tightening means 224 to a tightening angle of less than 360°. The actual tightening surface 260 of the tightening means is formed by the circumferential surfaces of the tightening disk 246 which are chamfered in the manner seen in FIGS. 14 and 17.

This tightening surface cooperates with the carcass-related component 222 (FIGS. 14 and 19) or 222' (FIG. 20) which is fastened on the inside surface of the carcass wall, and which has a simple rotation-symmetrical shape and is composed of a low cylindrical plug section 262 adjoining the carcass wall, and a top section 264 in the form of an inverted truncated cone adjoining the plug. The surface 266 of this truncoconical top section 264 slopes at an angle complementary to the tightening surface 260. The upper end of the truncoconical top section 264 is also adjoined by a thin, cylindrical section 268 whose diameter is approximately equal to the distance between the inside surfaces of the lateral walls 236 of the back-wall-related component 220. The back-wall-related component is thus laterally guided by the surface 270 of the cylindrical section 268, so that it can be displaced only parallel to the side walls 236 of the casing. The carcass-related component is fastened to the carcass wall by means of a mounting screw 272 whose threaded portion is driven into the carcass wall through a central through-bore 274 in the carcass-related component. At its upper end, the through-bore 274 has a counterbore 276 to matingly receive the head of the mounting screw 272.

Figure 20:
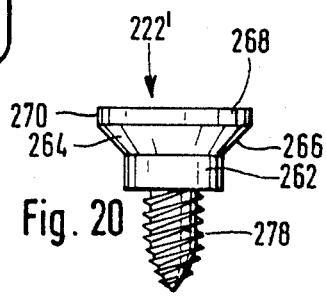
FIG. 20 is an alternative embodiment of the carcass-related component of the joining hardware set.
Figure 19:
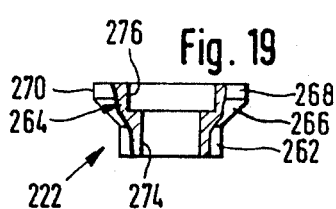
FIG. 19 is a partially fragmentary side view of the carcass-related component of the joining hardware set of FIGS. 14 to 16.

The alternative carcass-related component 222' shown in FIG. 20 differs from component 222 shown in FIG. 19 only in that it has a threaded shaft 278 formed integrally on the bottom of the stud section 262, whereby it can be driven into an associated pilot hole in the carcass wall 214, instead of a separate mounting screw. Alternatively, the threaded shaft can be part of a separately made screw which is inserted into the die before the carcass-related component is manufactured from plastic by the injection-molding method or from metal by die-casting. It is then desirable to make a tool-engagement recess in the form of a screwdriver slot or the like in the face of the top of the carcass-related component to permit the latter to be driven into the carcass.

I claim:

1. A set of hardware for rigidly, releasably joining one wall of a cabinet to another wall of the cabinet arranged substantially at right angles to the one wall in a plane; said set having:
    (a) a first component having means for fastening said first component to the one wall;
    (b) a second component for fastening to the other wall; and
    (c) tightening means for bringing said two components into interlocking engagement with one another and for clamping the same together to thereby pull the one wall against the other wall;
    said second component having a surface for placement against the other wall and having a first engaging surface projecting from said placement surface;
    said first component being an elongated housing open toward and at least partly over-reaching said second component, upon interlocking engagement of said components;
    said tightening means:
    (a) being rotatable about a first axis at right angles to said placement surface and substantially parallel to said plane; and
    (b) having a first disk with a second axis of rotation arranged at a given eccentricity with respect to said first axis and with a curved circumferential surface forming a second engaging surface for engagement with said first engaging surface.

2. A set of hardware according to claim 1, wherein said first engaging surface slopes away from said placement surface and from said plane, said circumferential surface sloping away in a complementary manner.

3. A set of hardware according to claim 1, wherein said second component is a mounting plate and has a projection extending from said plate into the interior of said first component, said first engaging surface being provided on said projection.

4. A set of hardware according to claim 2, wherein said first disk is circular over the greater part of its circumference and has opposite flat end faces from which pivot projections extend, said pivot projections being aligned with each other and being rotatably journaled in associated bearing recesses in said first component.

5. A set of hardware according to claim 3, wherein said first disk is circular over the greater part of its circumference and has opposite flat end faces from which pivot projections extend, said pivot projections being aligned with each other and being rotatably journaled in associated bearing recesses in said first component.

6. A set of hardware according to claim 2, wherein said first disk is spiral over the greater part of its circumference and has flat end faces from which aligned pivot projections extend, said projections being journaled in associated bearing recesses in said first component.

7. A set of hardware according to claim 3, wherein said first disk is spiral over the greater part of its circumference and has opposite flat end faces from which aligned pivot projections extend, said projections being journaled in associated bearing recesses in said first component.

8. A set of hardware according to any one of claims 4 to 7, wherein said pivot projection extending from the flat end face facing said second component is a substantially cylindrical pivot pin having a circumferential annular groove, and wherein an annular rib projects from the associated bearing recess in said first component.

9. A set of hardware according to any one of claims 4 to 7, wherein said pivot projection extending from the flat end face facing away from said second component is enlarged at its free end to form a circular second disk, said second disk being rotatably held flush in a circular opening in said first component and being provided on its top side accessible in said opening with means for engagement by a turning tool.

10. A set of hardware according to claim 8, wherein said pivot projection extending from the flat end face facing away from said second component is enlarged at its free end to form a circular second disk, said second disk being rotatably held flush in a circular opening in said first component and being provided on its top side accessible in said opening with means for engagement by a turning tool.

11. A set of hardware according to claim 9, wherein the diameter of said circular second disk is at least equal to the diameter of said first disk plus said eccentricity.

12. A set of hardware according to claim 9, wherein said means for the engagement of a turning tool is a tool engaging recess.

13. A set of hardware according to claim 11, wherein said second disk has a top side with a protrusion which extends radially slightly beyond the circumference thereof, said first component having two associated abutment surfaces against which said protrusion abuts after turning by a given angular amount.

14. A set of hardware according to claim 1 or 2, wherein said fastening means of said first component is a fastening plug to be inserted in an opening in the one wall.

15. A set of hardware according to claim 14, wherein said fastening plug has a hook projection on its side facing away from said second component.

16. A set of hardware according to claim 14, wherein said fastening plug is a separate piece, and means for pivoting said plug in said first component about an axis parallel to said placement surface and to said plane.

17. A set of hardware according to claim 16, wherein said fastening plug is a hammer-in plug of plastic, and oversize with respect to the opening in the one wall.

18. A set of hardware according to claim 17, wherein said hammer-in plug has a circumferential surface provided with radially projecting ribs of sawtooth-like cross-sectional profile.

19. A set of hardware according to claim 1 or 2, wherein said second component has a plug with a first plug section for fastening to the other wall, and a second section spaced from said first section and forming a head section of increased diameter in relation to said first section, a transition surface between said two sections forming said first engaging surface.

20. A set of hardware according to claim 19, wherein said first plug section is a relatively short cylinder and said second section is truncoconial with a base and a head.

21. A set of hardware according to claim 20, wherein a relatively thin, circular disk-like section adjoins said base.

22. A set of hardware according to claim 21, wherein said first component has side walls, and wherein said circular disk-like section has a diameter corresponding approximately to or slightly smaller than the free distance between said sidewalls.

23. A set of hardware according to claim 19, wherein said second component has a through-bore for a shank of a mounting screw for fastening said second component to said other wall.

24. A set of hardware according to claim 23, wherein said through-bore has a recess for matingly accommodating a head of the mounting screw.

25. A set of hardware according to claim 19, wherein on the end of said first plug section to face the other wall there is integrally formed a screw, and wherein in the opposite free end of said second section there is provided a tool-engaging recess for engagement by a turning tool, whereby said screw can be driven into a bore in the other wall.

* * * * *